(12) United States Patent
Charlet et al.

(10) Patent No.: US 8,867,652 B2
(45) Date of Patent: Oct. 21, 2014

(54) TRANSMITTER FOR MULTI-FORMAT DATA

(75) Inventors: Gabriel Charlet, Massy (FR); Jeremie Renaudier, Gif-sur-Yvette (FR)

(73) Assignee: Alcatel Lucent, Boulogne-Billancourt (FR)

( * ) Notice: Subject to any disclaimer, the term of this patent is extended or adjusted under 35 U.S.C. 154(b) by 119 days.

(21) Appl. No.: 13/319,437

(22) PCT Filed: Mar. 3, 2010

(86) PCT No.: PCT/FR2010/050356
§ 371 (c)(1),
(2), (4) Date: Dec. 9, 2011

(87) PCT Pub. No.: WO2010/136680
PCT Pub. Date: Dec. 2, 2010

(65) Prior Publication Data
US 2012/0076239 A1      Mar. 29, 2012

(30) Foreign Application Priority Data

May 29, 2009   (FR) ..................................... 09 53602

(51) Int. Cl.
*H04L 27/04* (2006.01)
*H04L 1/00* (2006.01)
*H04B 10/556* (2013.01)
*H04L 27/18* (2006.01)
*H04L 27/00* (2006.01)
*H04L 27/34* (2006.01)

(52) U.S. Cl.
CPC .......... *H04L 27/0008* (2013.01); *H04L 1/0003* (2013.01); *Y02B 60/31* (2013.01); *H04B 10/5561* (2013.01); *H04L 27/183* (2013.01); *H04L 27/3422* (2013.01)

USPC .......................................... 375/295; 375/300

(58) Field of Classification Search
CPC .................................................... H04L 27/0008
USPC .................................................... 375/295, 300
See application file for complete search history.

(56) References Cited

U.S. PATENT DOCUMENTS

| 5,463,357 | A | * | 10/1995 | Hobden | 332/151 |
| 5,982,807 | A | * | 11/1999 | Snell | 375/146 |
| 5,991,308 | A | * | 11/1999 | Fuhrmann et al. | 370/395.53 |
| 6,693,972 | B1 | * | 2/2004 | Flanagan | 375/295 |
| 2002/0075943 | A1 | * | 6/2002 | Kurihara | 375/146 |
| 2003/0058504 | A1 | * | 3/2003 | Cho et al. | 359/161 |

FOREIGN PATENT DOCUMENTS

| EP | 1011245 | 6/2000 |
| WO | 2006/109123 | 10/2006 |

* cited by examiner

*Primary Examiner* — Michael Neff
(74) *Attorney, Agent, or Firm* — Carmen Patti Law Group, LLC

(57) ABSTRACT

A data transmitter (A, B, C, D) wherein, in a first operating mode, the first and second carrier signals are mutually phase-shifted, and the data module generates said first and second data signals based on different data, so as to produce, at the transmitter's output, a modulated signal exhibiting a first constellation of states (A, B, C, D) in a complex plane, and, in a second operating mode of the transmitter, the data module generates said first and second data signals correlated with one another based on common data, so as to produce, at the transmitter's output, a modulated signal exhibiting a second constellation of states (A, D; E, F) in the complex plane that is more reduced and more dispersed then said first constellation of states.

17 Claims, 3 Drawing Sheets

TRANSMITTER FOR MULTI-FORMAT DATA

TECHNICAL FIELD The invention relates to the field of transmitting digital data, in particular optical transmissions.

BACKGROUND

In communication networks, advanced modulation formats are essential ingredients for carrying out efficient data transmissions. Due to the variety of transmission media in use and the variety of the disruptions that may affect the signals, there is no universally superior modulation format. In the field of optical transmissions, the search for higher data bitrates, for example of 100 Gbit/s/channel, has revealed that quadrature phase-shift keying (QPSK) modulation formats have very good performance.

To improve the flexibility of communication networks, one possible avenue is to design variable-bitrate data transmitters. Several solutions have been proposed to do this. For example, the document "Bit-Rate-Flexible All-Optical OFDM Transceiver Using Variable Multi-Carrier Source and DQPSK/DPSK Mixed Multiplexing", K. Yonenaga et al., in Proceedings of OFC/NFOEC 2009 discloses an OFDM optical transmitter in which the data bitrate may be adjusted by modifying the number of subcarrier signals and/or by selecting the modulation format of each subcarrier from between a DQPSK (differential quadrature phase-shift keying) format and a DPSK (differential phase-shift keying) format.

SUMMARY

According to one embodiment, the invention provides an optical signal transmitter comprising:
a first amplitude modulator capable of modulating a first carrier signal as a function of a first data signal,
a second amplitude modulator capable of modulating a second carrier signal as a function of a second data signal,
a signal combiner capable of directing towards the data transmitter's output a combination of the first modulated carrier signal coming from the first amplitude modulator and the second modulated carrier signal coming from the second amplitude modulator, and
a data module capable of generating said first and second data signals with a common modulation pace,
wherein, in a first operating mode of the transmitter, said first and second carrier signals are mutually phase-shifted, and said data module generates said first and second data signals based on different data, so as to produce, at the transmitter's output, a modulated signal exhibiting a first constellation of states in a complex plane, and, in a second operating mode of the transmitter, said data module generates said first and second data signals correlated with one another based on common data, so as to produce, at the transmitter's output, a modulated signal exhibiting a second constellation of states in the complex plane that is more reduced and more dispersed than said first constellation of states.

According to one particular embodiment, the second constellation of states is a subset of the first constellation of states. For example, it is possible to restrict the numerical values of both of the digital signals in the second operating mode, for example to make them equal, so that some states of the first constellation are never reached, which has the effect of encoding the data onto a subset of the first constellation. Preferentially, this subset exhibits a minimum Euclidean distance greater than the minimal Euclidean distance of the first complete constellation.

In addition to the numerical values transmitted, another physical parameter that may influence the transmitted signal's constellations of states is the phase shift between the first and second carrier signal.

According to one particular embodiment, the first and second carrier signals are roughly in quadrature phase in the transmitter's first operating mode. For example, in this situation, the first constellation of states may be a QPSK or QAM (quadrature amplitude modulation) constellation. In corresponding embodiments, the second constellation of states may be a BPSK or QAM constellation.

The phase shift between the first and second carrier signal may be kept constant in both of the transmitter's operating modes For example, in this situation, the first and second carrier signals may also be roughly in quadrature phase in the transmitter's second operating mode.

According to one alternative embodiment, the phase shift between the first and second carrier signals may be modified between the transmitter's first and second operating mode, for example to reduce or mostly cancel out this phase shift. According to one particular embodiment, said first and second carrier signals are roughly in phase in the transmitter's second operating mode. This reduction or cancellation of the phase shift in the second operating mode may increase the dispersion of the second constellation of states.

Many options exist to generate carrier signals, for example, using two respective signal sources, potentially equipped with signal phase control means. Alternatively, the carrier signals may be produced from a common source.

According to one particular embodiment, the transmitter comprises a signal splitter capable of producing the first and second carrier signals by splitting a source signal by directing a first fraction of the source signal towards a first transmission branch comprising the first amplitude modulator and a second fraction of the source signal towards a second transmission branch comprising the second amplitude modulator.

Preferentially, the transmitter comprises a phase-shifting device disposed among at least one of said transmission branches and capable of applying a phase shift between the first carrier signal and the second carrier signal. According to one particular embodiment, the phase-shifting device is capable of applying an adjustable phase shift. For example, the phase-shifting device applies a quadrature phase shift in the first operating mode and a reduced phase shift, preferentially about zero, in the second operating mode. Other embodiments are possible in order to create the means of adjusting the phase shift between said first and second carrier signals.

According to the applications, the carrier signals may be chosen from among different parts of the electromagnetic spectrum, for example the microwave domain, the infrared domain, or the optical domain.

In one particular embodiment, the carrier signals are optical signals and the amplitude modulators comprise Mach-Zehnder modulators. In particular, Mach-Zehnder modulators may be used as phase modulators, because a multiplication of the field's amplitude by a factor of −1 is equivalent to a phase shift of 180°.

In other advantageous embodiments, the communication node may exhibit one or more of the following characteristics:
a command interface capable of receiving a command signal for selectively placing the transmitter within the first or second operating mode.
the data module comprises a data input interface capable of receiving a data flow to be transmitted and a processing module capable of processing said data flow to be transmitted in order to generate said first and second data signals, said processing module being capable of processing a data flow with a first bitrate in the first operating mode and a flow of a second, lower bitrate in the transmitter's second operating mode.

the data input interface comprises a plurality of parallel input lines for receiving parallel incoming flows composing the data flow to be transmitted.

the data module is capable of selectively disabling a subset of said parallel input lines in the transmitter's second operating mode.

the processing module comprises a parallel-serial conversion module in order to produce the first and second data signals based on a plurality of said parallel incoming flows, the incoming flows exhibiting a comment data rate less than said modulation rate of the first and second data signals. the processing module comprises an FEC encoding module for applying an error correction code to the data flow to be transmitted. The FEC encoding may be constant or variable from one operating mode to the other. For example, the FEC encoding exhibits an excess flow of about 30% with 40 Gb/s of incoming flow in order to achieve a bit rate of 56 Gb/s in a PDM-BPSK transmission, and an excess flow of about 12% with 100 Gb/s of incoming flow in order to achieve a bit rate of 112 Gb/s in a PDM-QPSK transmission.

In one embodiment, the invention also provides a data-transmitting assembly that uses polarization multiplexing, comprising a first aforementioned data transmitter in order to produce, at the first data transmitter's output, a first modulated signal exhibiting a first polarization state, a second aforementioned data transmitter in order to produce, at the second data transmitter's output, a second modulated signal exhibiting a second polarization state and a signal combiner capable of directing to an output of the transmitting assembly a combination of the first modulated signal coming from the first data transmitter and the second modulated signal coming from the second data transmitter.

One idea at the basis of the invention, is to design a variable-bitrate data transmitter in which it is possible to selectively employ at least two constellations of states for the transmitted signal, so as to employ either a more populated and denser constellation, which makes it possible to obtain a higher data transmission rate, or a less populated and more dispersed constellation, which makes it possible to obtain a higher resistance of the signal to disruptions, at the cost of a reduction in the transmission rate. Another idea at the basis of the invention is to obtain a modulated signal with a more dispersed constellation by superimposing multiple carrier components carrying modulations that are correlated with one another, so that these components combine constructively in their various modulation states. Yet another idea at the basis of the invention is to perform the constellation's selection without changing the symbol transmission rate, so as to simplify the implementation of the signal's processing chain in such a transmitter. The implementation of a corresponding receiver may also be facilitated through the use of a constant clock rate. According to one embodiment, a consistent optical reception may be used.

DESCRIPTION OF THE DRAWINGS

The invention will be better understood, and other purposes, details, characteristics, and advantages thereof will become more clearly apparent upon examining the following description of multiple particular embodiments of the invention, which are given only by way of illustrative and non-limiting examples, with reference to the attached drawings. In these drawings.

DETAILED DESCRIPTION

Figure 1:
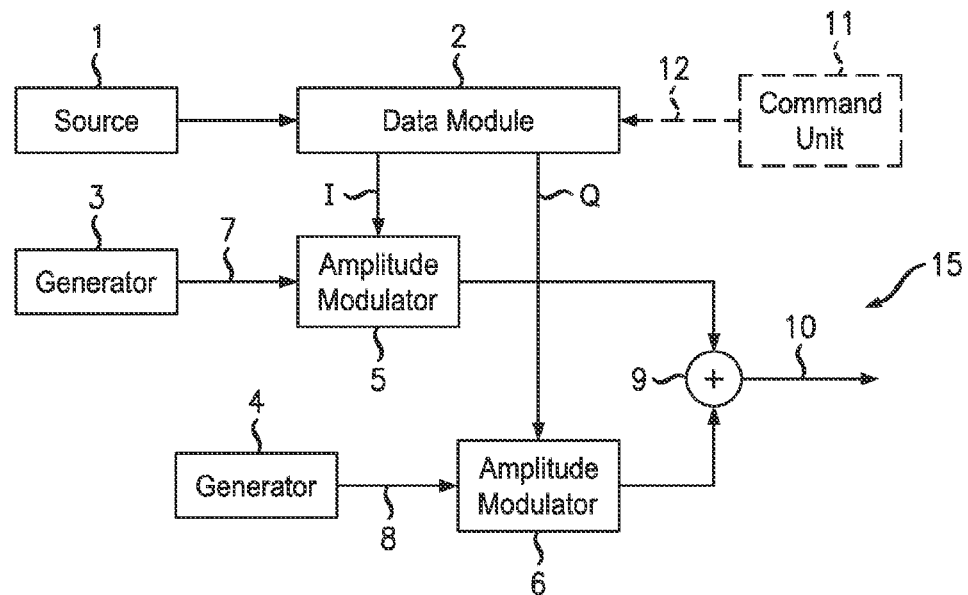
FIG. 1 is a functional block diagram of a data transmitter according to the first embodiment.

With reference to FIG. 1, a data transmitter 15 comprises a source of data 1 comprising digital data to be transmitted, a data module 2 for forming modulation signals I(t) and Q(t) based on digital signals, two quadrature-phase carrier signal generators 3 and 4, an amplitude modulator 5 for modulating the first carrier signal 7 with the modulation signal I, an amplitude modulator 6 for modulating the second carrier signal 8 with the modulation signal Q, and a signal combiner for transmitting the sum of the two modulated carrier signals to the transmitter's signal output 10. For example, the output signal S(t) may take the form:

$$S(t)=I(t)\cdot COS(wt)+Q(t)\cdot SIN(wt), \text{ where } w \text{ designates the carrier frequency.}$$

The signals I and Q preferentially have the same modulation rate in baud. The data module 2 comprises a command interface for receiving a command signal 12, for example from a command unit 11. The command signal 12 selects an operating mode of the data module 2 from among two provided modes. In a first operating mode, the modulation signals I and Q each carry a different subset of the data to be transmitted, so as to maximize the data rate coming out of the transmitter 15. For example, the outgoing signal's modulation format is a 4-QAM format (which may also be designated QPSK) whenever the modulation signals I and Q each have two logical states. N-QAM modulation formats, N being a whole number greater than 4, for example 8, 16 or 64 or another, may be obtained in a similar fashion with I and Q modulation signals having the advantage of logical states. The constellation diagrams of these modulation formats in the complex plane are known.

In a second operating mode, the modulation signals I and Q deal with datasets to be transmitted which at least partially overlap, so as to produce a constellation of states that is both less numerous and more dispersed than in the first operating mode. In other words, the constellation obtained within the second operating mode comprises fewer states and these states are, on average, further apart from one another than in the first operating mode. Preferentially, the minimal Euclidian distance between two states of the second constellation is less than the minimal Euclidian distance between two states of the first constellation.

Figure 3:
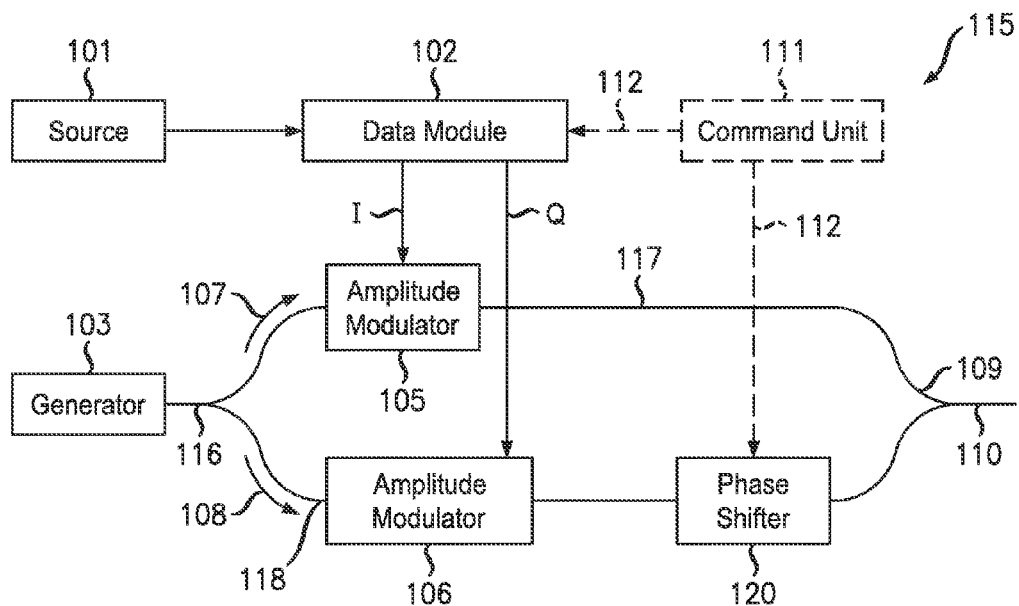
FIG. 3 is a functional block diagram of a data transmitter according to the second embodiment.

According to one example embodiment, the signals I and Q in the second operating mode deal with exactly the same data, so that I(t)=Q(t). FIG. 3 represents constellations obtained in this situation with modulation signals I and Q, each having two logical states 0 and 1. In the first operating mode, a QPSK (or 4-QAM) constellation exhibiting 4 modulation states (or symbols) 00, 01, 10 and 11 represented at points A, B, C, D.

These states are placed roughly on a circle 19 with a radius a√2, where a is the amplitude of the modulation signals I and Q.

In the second operating mode, I and Q transport the same binary flow, such that the states B and C are no longer reached anymore. The result is a reduced constellation formed of the points A and D, i.e. a BPSK constellation, whose minimal Euclidean distance is increased by a factor √2 with respect to the QPSK constellation, which makes it possible to gain 3 dB in detected power. Similar advantages would be obtained with the choice I(t)+Q(t)=0.

In comparison, if the reduction in data flow were to be carried out by canceling out the modulation signal Q, the resulting constellation represented at points Y and Z would exhibit a minimal Euclidian distance reduced by a factor of √2 with respect to the QPSK constellation.

According to another embodiment, the signal generator 4 is capable of adjusting the phase of the carrier signal 8 and capable of directly or indirectly receiving the command signal 12 in order to carry out this phase adjustment as a function of the selected operating mode. In this embodiment, the faceshift of the carrier signal 8 may be reduced in the second operating mode in order to increase the constructive interference of the two modulated components. FIG. 3 represents, at points E and F, the modified constellation obtained in the second operating mode whenever the phase shift between the two carrier signals is canceled out. The minimal Euclidian distance is then increased by a factor of 2 with respect to the QPSK constellation, which makes it possible to gain 6 dB in detected power.

The source of data 1 may be carried out in different ways, for example in the form of memories or other data storage devices. The data module 2 comprising an input interface linked to the source of data 1 by optical or electrical links, for example 10 Gigabit Ethernet links, or any other type of data link.

The transmitter 15 may be carried out for carrier pulses w belonging to different parts of the electromagnetic spectrum, for example radio waves. With reference to FIG. 3, an embodiment of a transmitter is described that is specifically adapted to the optical domain. Elements identical or analogous to those in FIG. 1 bear the same reference number, increased by 100.

Figure 2:
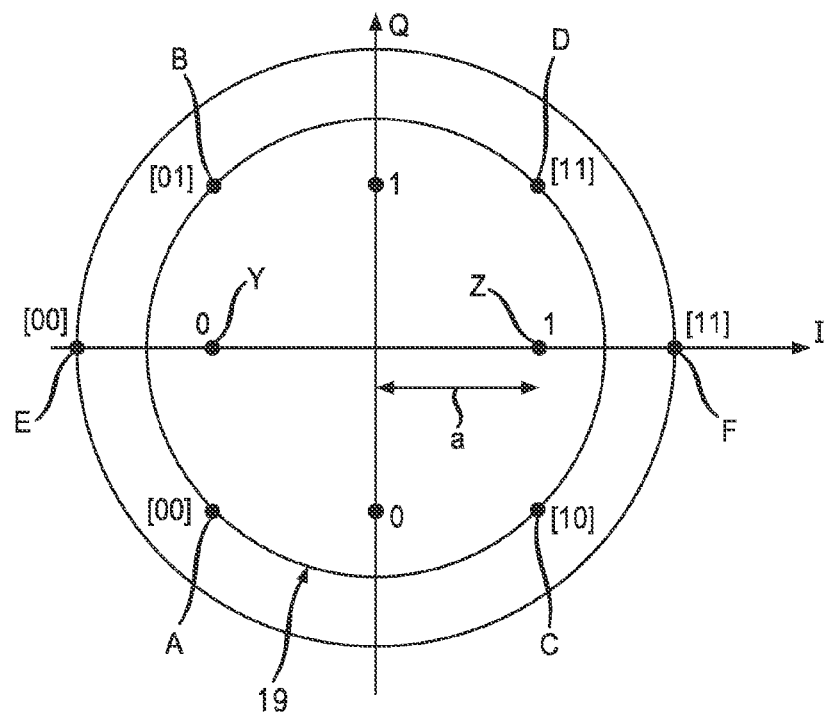
FIG. 2 is a diagram representing examples of constellations that may be used in the invention's embodiments.

The optical transmitter 115 comprises a laser source 103, a beam splitter 116 that equally divides the source beam into a first carrier beam 107 spreading into a waveguide branch 117 and a second carrier beam 108 spreading into a waveguide branch 118. On each waveguide branch, an Mach-Zehnder amplitude modulator 105 and 106 is placed, respectively supplied by signals I(t) and Q(t) delivered by the data module 102. A phase-shifter 120 is mounted on the branch 118 in order to apply a phase delay of 90° from the second carrier beam 108. The phase-shifter 120 is preferentially carried out in the form of an adjustable delay electrode. An optical coupler 109 superimposes the two modulated carrier beams. By controlling the data module 102 and, if need be, the phase-shifter 120 in the same way as in the embodiment of FIG. 1, the optical transmitter 115 makes it possible to obtain the same constellations as in FIG. 2. In one variant, a pulse generator that is not depicted may be serially installed with the modulators 105 and 106 according to the known technique, for example, before the splitter 116 or after the coupler 109, to produce signals in the RZ-QPSK and RZ-BPSK modulation format, respectively, in the first and second operating mode.

The transmitter 115 may be employed to carry out variable-bitrate optical transmissions achieving, for example, a data bit rate of 56 Gb/s in QPSK format in the first operating mode, and 28 Gb/s in BPSK format in the second operating mode for I and Q signals at 28 GBaud. Preferentially, the rate of I and Q is not modified between the two operating modes, such that the data module 102 may be carried out with fixed-bitrate components. By such a change in modulation format, the signal's resistance to disruptions is heavily increased, which makes it possible to achieve a greater transmission distance.

Figure 4:
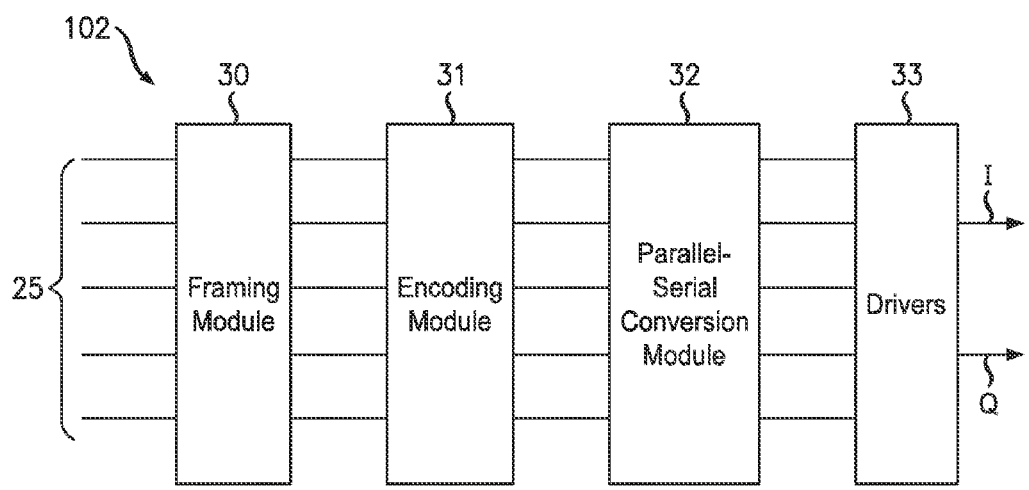
FIG. 4 is a functional block diagram of a data module that may be used in the invention's embodiments, FIGS. 5 and 6 representing other examples of constellations that may be used in the invention's embodiments.

With reference to FIG. 4, a detailed embodiment of the data module 102 will now be described, which is suitable, for example, to incoming data flows that meets the 10 Gb Ethernet standard. The data module 102 comprises an aggregation and framing module 30 equipped with five inputs 25 at 10 Gb/s. In the first operating mode, the module 30 may receive five incoming parallel flows. The data handled by the module 30 is sent along to a forward error correction encoding module 31, also in the form of five flows parallel to 10 Gb/s. The data encoded by the module 31 is sent along to a parallel-serial conversion module 32, also in the form of five parallel flows, at a high bitrate as a function of the code used, for example, at 11.2 Gb/s. The module 32 converts five incoming flows into two parallel flows at a bitrate of 28 Gb/s that are passed to drivers or electronic amplifiers 33 to produce analog modulation signals I and Q.

In the second embodiment, the module 30 processes an incoming flow reduced by half, for example, by completely disabling two of the inputs 25 and by reducing the flow on one-third of the inputs 25. With this data, the modulation signal I may be produced in the same way as in the first operating mode. Additionally, the received data flow is duplicated at one level of the processing chain, for example, in the framing module 30 or within the forward error correction encoding module 31, such that the modulation signal Q is produced based on the same data flow as the signal I. The components located downstream of the duplication operation, for example the parallel-serial conversion module 32 and the pilots 33, the change in the transmitter's operating mode may be totally transparent. No complexity is therefore added to these components with respect to a fixed-rate transmitter.

In one variant, the ratio of the incoming bit rates between the first and second operating mode may be different by two. For example, the performance of the FEC encoding, and therefore the corresponding excess debt, may be modified between the two operating modes. For the same outgoing bit rate, the increase in the FEC bitrate makes it possible to process a lower incoming bitrate.

Figure 5:
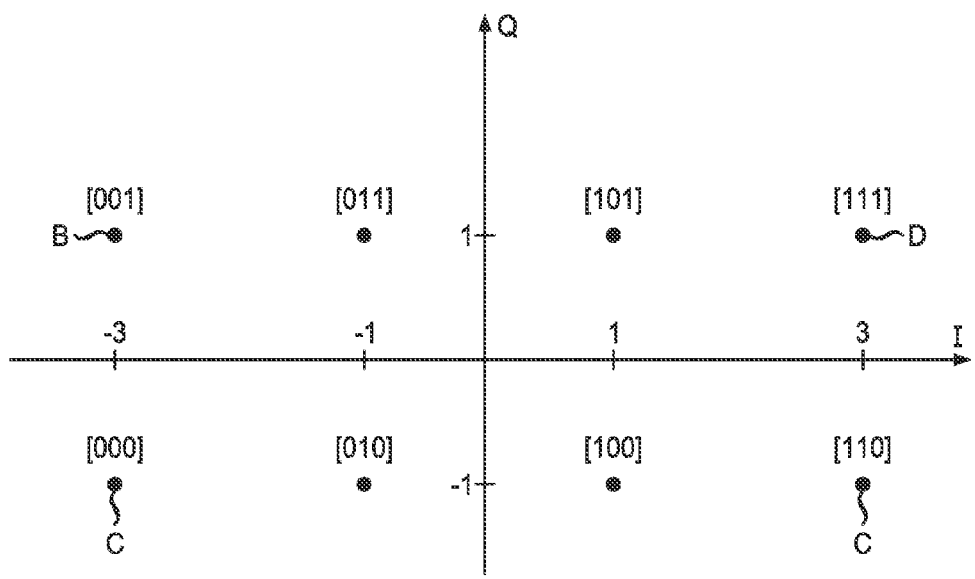
Figure 6:
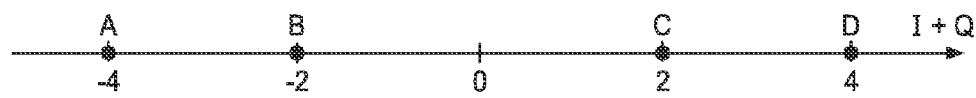

With reference to FIGS. 5 and 6, another example of QAM constellations is described, which may be used to carry out variable-bitrate transmissions. In this example, the modulation signal I is one signal with four levels, which therefore encodes two bits B1B2 per clock beat. The modulation signal Q is one signal with four levels, which encodes one bit B0 per clock beat. The corresponding transmitter may be carried out similarly to in FIG. 1. A symbol worth three bits [B0B1B2] is thereby transmitted at the output. In the first operating mode, the symbols are used to transport data at the nominal bitrate, i.e. 3f, where f is the clock rate in baud. In the second operating mode, signal Q is partially formed from the same data as the signal I, so that B0=B1 at all times. The data bit rate is reduced to 2f. The constellation used in the second operating mode is reduced to the symbols 000, 001, 110 and 111 designated by the points A, B, C, D. The minimal Euclidian distance is unchanged, but the constellation's dispersion is increased overall. FIG. 6 represents the shape of the second constellation if the phase shift between the two carrier signals is removed in the second operating mode.

Other embodiments of transmitters may exhibit more than two operating modes, with many increasingly reduced constellations to achieve increasingly long transmission distances.

A signal transmitter has essentially been described making it possible to adjust the data bit rate over a carrier channel among multiple values. The bitrate adjustment obtained on one channel may be obtained in a demultiplexed manner using channel multiplexing techniques in which each channel's bit rate is adjusted as described previously. For example, optical channels may be polarization-division multiplexed and/or wave-division multiplexed. In one corresponding embodiment, an optical transmitter implementing polarization multiplexing produces a modulated signal in PDM-QPSK format in a first operating mode, for example at a bit rate of 112 Gb/s, and a modulated signal in PDM-BPSK format in the second operating mode, for example at a bit rate of 56 Gb/s. In this situation, each polarization is modulated by a pair of signals I and Q as described previously.

Some of the elements depicted, particularly the command units and other modules, may be constructed in various forms, in a stand-alone or distributed fashion, using hardware and/or software components. Hardware components that may be used are application-specific integrated circuits, field-programmable gate arrays, or microprocessors. Software components may be written in various programming languages, such as C, C++, Java, or VHDL, and compiled in object form. This list is not exhaustive.

The command unit 11 or 111 may be constructed in the form of a network management device enabling a human operator to select the transmitter's operating mode based on traffic demand and the physical restrictions of the transmission to be carried out or capable of performing this selection automatically.

Although the invention has been described in connection with multiple specific embodiments, it is naturally not in any way limited to them, and comprises all technical equivalents of the means described, as well as their combinations, if said combinations fall within the scope of the invention.

The use of the verb "comprise" or "include" and their conjugated forms does not exclude the presence of elements or steps other than those set forth in a claim. The use of the indefinite article "a" or "an" for an element or step does not, unless otherwise stated, excluded the presence of a plurality of such elements or steps. Multiple means or modules may be depicted by a single hardware element.

In the claims, any reference sign within parentheses should not be interpreted as limiting the claim.

The invention claimed is:

1. A data transmitter comprising:
a first amplitude modulator capable of modulating a first carrier signal based on a first data signal;
a second amplitude modulator capable of modulating a second carrier signal based on a second data signal;
a signal combiner capable of directing towards an output of the data transmitter a combination of the first modulated carrier signal coming from the first amplitude modulator and the second modulated carrier signal coming from the second amplitude modulator;
a data module capable of generating the first data signal and the second data signal with a common modulation pace; and
a signal splitter capable of producing the first carrier signal and the second carrier signal by splitting a source optical signal by directing a first fraction of the source optical signal to a first transmission branch comprising the first amplitude modulator and a second fraction of the source optical signal to a second transmission branch comprising the second amplitude modulator;
wherein in a first operating mode of the data transmitter, the first carrier signal and the second carrier signal are mutually phase-shifted, and the data module generates the first data signal and the second data signal based on different data to produce, at the output of the data transmitter, a modulated signal exhibiting a first constellation of states in a complex plane; and
wherein in a second operating mode of the data transmitter, the data module generates the first data signal and the second data signal correlated with one another based on common data to produce, at the output of the data transmitter, a modulated signal exhibiting a second constellation of states in the complex plane that is more reduced and more dispersed than the first constellation of states; and
wherein the data module comprises a data input interface configured to receive a data flow to be transmitted and a plurality of parallel input lines for receiving parallel incoming flows that compose the data flow to be transmitted, and wherein the data module is capable of selectively disabling a subset of the plurality of parallel input lines in the second operating mode of the data transmitter.

2. The data transmitter according to claim 1, wherein the second constellation of states is a subset of the first constellation of states.

3. The data transmitter according to claim 1, wherein the first carrier signal and the second carrier signal are about in quadrature-phase in the first operating mode of the data transmitter.

4. The data transmitter according to claim 3, wherein the first constellation of states is a quadrature phase-shift keying (QPSK) constellation.

5. The data transmitter according to claim 4, wherein the second constellation of states is a quadrature amplitude modulation (QAM) constellation.

6. The data transmitter according to claim 3, wherein the first carrier signal and the second carrier signal are about quadrature in the second operating mode of the data transmitter.

7. The data transmitter according to claim 3, wherein the first carrier signal and the second carrier signal are about in phase in the second operating mode of the data transmitter.

8. The data transmitter according to claim 1, wherein the data transmitter comprises a phase-shifted device disposed in at least one of the transmission branches and capable of applying a phase-shift between the first carrier signal and the second carrier signal.

9. The data transmitter according to claim 8, wherein the phase-shift is capable of applying an adjustable phase shift.

10. The data transmitter according to claim 1, wherein the amplitude modulators comprise Mach-Zehnder modulators.

11. The data transmitter according to claim 1, wherein the data transmitter comprises a command interface capable of receiving a command signal for selectively placing the data transmitter into the first or second operating mode.

12. The data transmitter according to claim 1, wherein the data module further comprises a processing module capable of processing the data flow to be transmitted in order to generate the first data signal and the second data signal, the processing module being capable of processing a data flow at a first bit rate in the first operating mode, and a data flow at a second, lower bit rate in the second operating mode of the data transmitter.

13. The data transmitter according to claim 12, wherein the processing module comprises a parallel-serial conversion module configured to produce the first data signal and the second data signal based on a plurality of the parallel incoming flows, the plurality of the parallel incoming flows exhibiting a common data rate less than a modulation rate of the first data signal and the second data signal.

14. A data transmitter comprising:
- a first amplitude modulator configured to modulate a first carrier signal based on a first data signal;
- a second amplitude modulator configured to modulate a second carrier signal based on a second data signal;
- a signal combiner configured to direct towards an output of the data transmitter a combination of the first modulated carrier signal coming from the first amplitude modulator and the second modulated carrier signal coming from the second amplitude modulator; and
- a data module configured to generate the first data signal and the second data signal with a common modulation pace;
- wherein the data module comprises a data input interface configured to receive a data flow to be transmitted and a processing module configured to process the data flow to be transmitted in order to generate the first data signal and the second data signal, and wherein the processing module comprises a parallel-serial conversion module configured to produce the first data signal and the second data signal based on a plurality of the parallel incoming flows, the plurality of the parallel incoming flows exhibiting a common data rate less than a modulation rate of the first data signal and the second data signal.

15. The data transmitter according to claim 14, wherein the carrier signals are optical signals.

16. The data transmitter according to claim 14, wherein the processing module comprises an encoding module configured to apply a forward error correction code to the data flow to be transmitted.

17. The data transmitter according to claim 14, further comprising:
- a signal splitter configured to produce the first carrier signal and the second carrier signal by splitting a source signal by directing a first fraction of the source signal to a first transmission branch comprising the first amplitude modulator and a second fraction of the source signal to a second transmission branch comprising the second amplitude modulator.

* * * * *